Aug. 4, 1953
A. F. JACKSON
2,647,740
HYDROSTATIC WEIGHING SCALE
Filed June 13, 1950
2 Sheets-Sheet 1
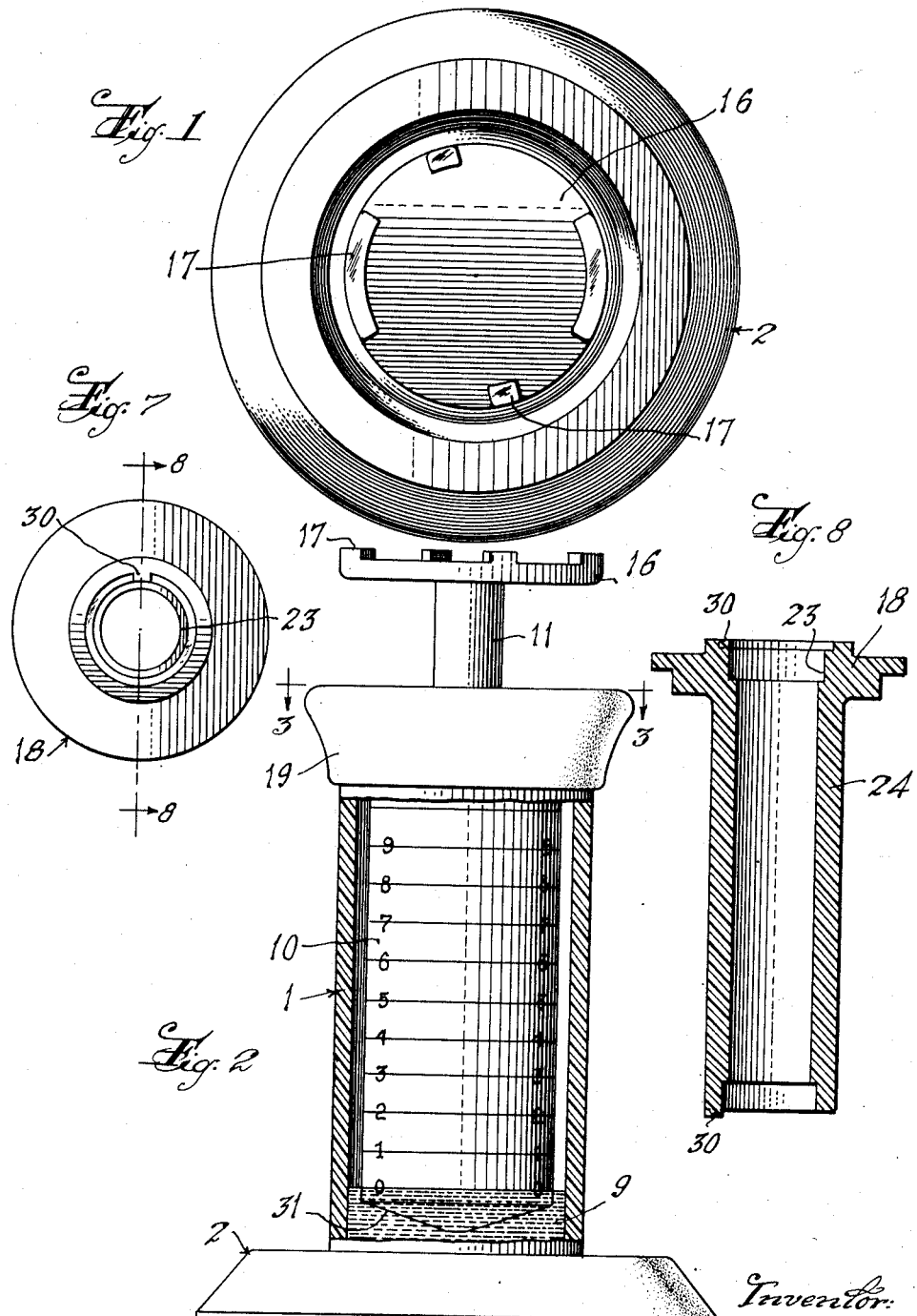

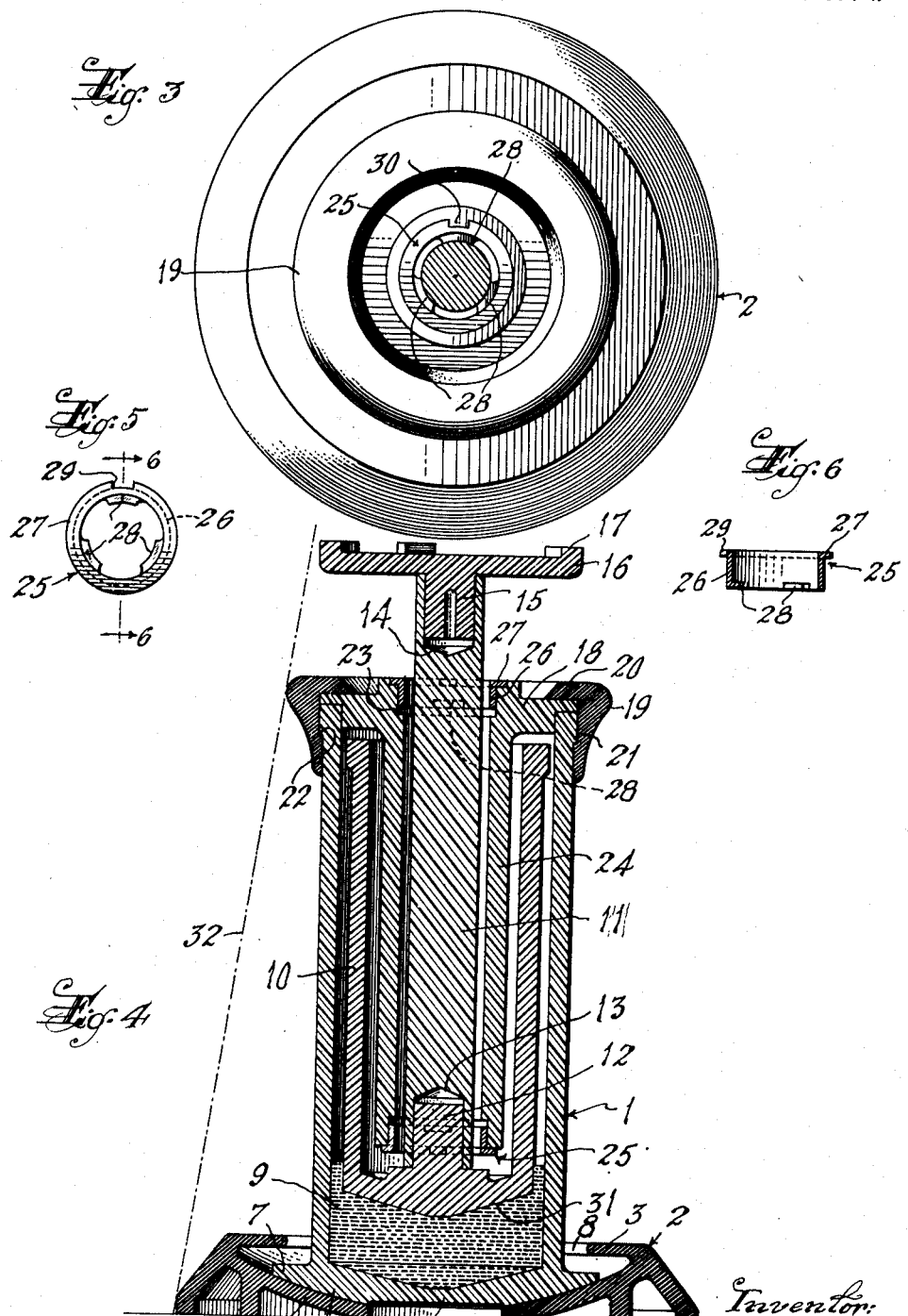

Patented Aug. 4, 1953

2,647,740

UNITED STATES PATENT OFFICE 2,647,740

HYDROSTATIC WEIGHING SCALE

Alexander F. Jackson, East Orange, N. J.

Application June 13, 1950, Serial No. 167,756

2 Claims. (Cl. 265—43)

This invention relates to weighing scales of the type that operate upon the principle that a body floating in a liquid loses in weight the weight of the volume of the liquid displaced by said body.

A weighing scale of this character is described and claimed in my co-pending application Serial No. 2,930, filed January 17, 1948, now Patent No. 2,545,923, and comprises a cylindrical cup-shaped plunger floated in a liquid in a vessel and having a pan to receive articles to be weighed, and means for guiding said float in a true vertical movement within said vessel with a minimum of friction. The accuracy of weighing with this scale depends on the amount of the immersion of said plunger into its supporting liquid which is shown by the liquid surface contact with the plunger, and the plunger is provided with a graduated scale wherein the plunger's weight (with nothing to weigh on its pan) is shown by the "zero" graduation; and consequently anything added to the plunger's weight, for example by an article placed on said pan, will be accurately weighed as the additional immersion of the plunger into the liquid indicates on said scale.

In devices of this character and especially when a liquid of high specific gravity such as mercury is used, it is desirable to have the volumes of the parts and of the liquid small relatively to the weighing capacity and that the parts shall be compactly assembled. Furthermore, in order to obtain maximum accuracy, it is essential that the plunger be accurately guided with a minimum of friction, and where the parts are small and compactly associated with each other, this is difficult to attain.

Therefore, a prime object of the present invention is to provide a weighing scale of the general character described whereby the above-mentioned desirable results and advantages shall be achieved.

Another object is to provide such a weighing scale which shall include novel and improved means for guiding the plunger so as to insure minimum friction incident to movement of the plunger relatively to the guide means, even when the load on the weighing pan is eccentric or unbalanced with respect to the plunger.

A further object is to provide a plunger in a scale of this character which shall be constructed in a novel and improved manner to maintain a substantially frictionless contact between the plunger and the liquid during weighing operations.

Other objects of the invention are to provide a hydrostatic weighing scale which shall have all of said advantages and be capable of producing all of the above-mentioned desirable results, and at the same time shall be simple and economical in construction; and to obtain other advantages and results that will be brought out by the following description in conjunction with the accompanying drawings wherein Figure 1 is a top plan view of a hydrostatic weighing scale constructed in accordance with the invention;

Figure 2 is a front elevational view of the weighing scale with parts broken away and shown in section;

Figure 3 is a horizontal sectional view approximately on the plane of the line 3—3 of Figure 2;

Figure 4 is a central vertical sectional view through the weighing scale;

Figure 5 is a detached plan view of one of the guide elements for the plunger;

Figure 6 is a transverse vertical sectional view approximately on the plane of the line 6—6 of Figure 5;

Figure 7 is a detached top plan view of the cover for the liquid containing vessel; and Figure 8 is a transverse vertical sectional view approximately on the plane of the line 8—8 of Figure 7.

Basically the scale is the same as that described in my above-mentioned co-pending application and comprises an outer cup-shaped vessel 1 of transparent plastic or other suitable transparent material, seated on an annular base 2 which may be formed of hard rubber or synthetic plastic composition of suitable density and has an inwardly extending retaining flange 3 at its upper edge and another supporting flange 4 midway of its height of larger area than the flange 3 and formed with a segmental spherical upper face.

The outer vessel 1 has a bottom wall 5 provided with an enlarged spherical edge portion 6 extending into a peripheral flange 7 and the bottom surface of said enlarged portion 6 is conformed in shape to the spherical upper surface of the flange 4 of the base upon which it rests. A space 8 is provided between the outer vessel and the inner edge 3 of the flange of the base to permit the vessel to be tilted slightly in its seat on the base in any direction so as to ensure accurate vertical positioning of the vessel.

Within the vessel is a quantity of a suitable liquid, particularly a liquid 9 of high specific gravity such as mercury.

A cup shaped float or plunger 10 floats upon the said liquid within the vessel 1 and has a cylindrical stem 11 mounted centrally on the bottom wall of the plunger. As shown, said bottom wall of the plunger has an integral stud 12 projecting upwardly and centrally therefrom and the stem 11 has a socket 13 in which said stud is snugly fitted. The stem also has a socket 14 at its upper end in which is fitted a stud 15 disposed centrally of a weighing pan 16, whereby the weighing pan is firmly mounted on the plunger. The plunger and stem may be formed of any suitable material, preferably a synthetic plastic composition such as polystyrene. The pan 16 has a plurality of upstanding projections 17 to facilitate positioning of an article to be weighed on the pan.

The outer surface of the side walls of the plunger 10 is provided with a graduated scale consisting of continuous circumferential lines, the zero or minimum weighing line of which is at the level of the liquid when the plunger is not in use, as shown in Figure 2. When an article to be weighed is placed on the pan 16, the plunger 10 is moved farther downwardly into the liquid, thereby displacing some of the liquid so as to raise the level of the liquid which in conjunction with the scale on the plunger measures the weight of the article.

In accordance with the invention novel and improved means are provided for centering and guiding the plunger in the outer vessel 1; and as shown a combined cover and guide 18 is connected with a liquid tight joint to the open end of the vessel. If desired, an elastic sealing ring 19 may be provided, said ring having a flange 20 projecting inwardly to overlie the top of the cover-guide 18, and another circumferential flange 21 to engage the outer surface of the vessel 1. If desired a circumferential shoulder 22 or other suitable projection may be provided on the outer surface of the vessel to interlock with the sealing ring.

An opening 23 is provided in the center of the cover 18, and depending from the underside of the cover and surrounding said opening is an integrally formed guide tube 24 that extends downwardly into the plunger in surrounding telescopic relation to the stem 11. Secured within the cover-guide 18 in distantly spaced relation to each other are two guide elements 25 formed of suitable material, preferably stainless steel, and each comprising a tubular cylindrical portion 26 snugly fitted into the opening 23, and a circumferential flange 27 to abut the end of the cover. A plurality of circumferentially spaced guide lugs 28 project inwardly from the cylindrical portion 26 to frictionally engage the plunger stem 11, the inner surfaces of said lugs being concentric with the stem and curved correspondingly to the curvature of the outer surface of the stem. The flange 27 has a notch 29 to nicely receive a lug 30 molded integrally with the cover member and extending to the opening 23.

With this construction, it will be noted that one guide element 25 is mounted in the cover-guide at each end of the guide tube so that said elements engage the plunger stem 11 at distantly spaced points along the length of the latter; specifically, one guide element engages the stem close to the inner end of the stem while the other guide element engages the stem adjacent the outer end of the stem. This arrangement of the bearing elements in conjunction with the small diameter of the stem 11 minimizes the friction incident to movement of the plunger even when the article being weighed is disposed eccentrically or off balance on the pan 16, the stem being freely slidable and rotatable.

To further reduce the friction in the scale, the outer surface of the lower end or bottom of the plunger is made conical, and preferably truncated as indicated at 31 for manufacturing purposes. With this construction, the plunger in effect seats on a concave conical seat in the liquid whereby friction between the end of the plunger and the liquid is reduced to the minimum upon downward movement of the plunger. The friction may be further reduced by gently twisting or rotating the pan 16 with the article being weighed set thereon, a "true floating action" without any bearing friction affecting the true liquid displacement principle, being thus obtained.

It will be observed that the tubular guide 24 projecting from the tightly fitting cover 18 into the outer vessel in surrounding relation to the opening in the cover, will prevent the spillage of liquid from the outer vessel in case the scale should be tipped over. To protect the pan 16 against injury incident to tipping of the scale, the sealing ring 19 may be made of such diameter that it will engage the supporting surface and prevent striking of the pan against said surface as indicated by the dot and dash line 32 in Figure 4.

It will thus be seen that the invention provides a simple, small and compact, inexpensive and reliable hydrostatic weighing scale, and while the invention has been described as embodied in certain specific structural details, it should be understood that the construction of the scale may be modified and changed within the spirit and scope of the invention; for example the stem 11 could be polygonal in cross section and have circular bearing elements associated therewith and the contact points 28 could be in the form of balls or could be shaped as desired depending upon the cross-sectional shape of the stem 11.

I claim:

1. A hydrostatic weighing scale comprising an outer vessel containing liquid and having a tight fitting cover provided with a central opening, a cup-shaped plunger inside said vessel having its bottom end submerged in said liquid and having a coaxial stem connected at one end to the interior of the bottom wall of the plunger in spaced relation to the side wall of the plunger and extending vertically upwardly through said opening in the cover with its upper end projecting above said cover and formed to support an article to be weighed, a graduated scale on the plunger to coact with the level of said liquid for measuring the weight of the supported article, and a centering and guiding tube coaxial with said opening depending from said cover, said tube extending into said plunger in closely spaced telescopic relation to said stem with its inner end close to the bottom wall of the plunger, and guide elements spaced longitudinally of said stem, one guide element being mounted at the outer end of said cover and extending into said opening, and the other guide element being mounted at the inner end of said tube on the interior thereof, both guide elements having portions disposed concentrically with and nicely frictionally contacting said stem to provide for sliding and rotating motions of the stem to center and guide the stem in such motions.

2. A hydrostatic weighing scale as defined in claim 1 wherein each guide element comprises a ring surrounding said stem and said portions of the guide elements constitute radially inwardly projecting lugs on the rings.

ALEXANDER F. JACKSON.

References Cited in the file of this patent

UNITED STATES PATENTS

| Number | Name | Date |
|---|---|---|
| 232,245 | Deschamps | Sept. 14, 1880 |
| 607,010 | Baumann | July 12, 1898 |
| 1,013,479 | Elliott et al. | Jan. 2, 1912 |
| 2,487,664 | Morgan | Nov. 8, 1949 |
| 2,545,923 | Jackson | Mar. 20, 1951 |